Figure 1:
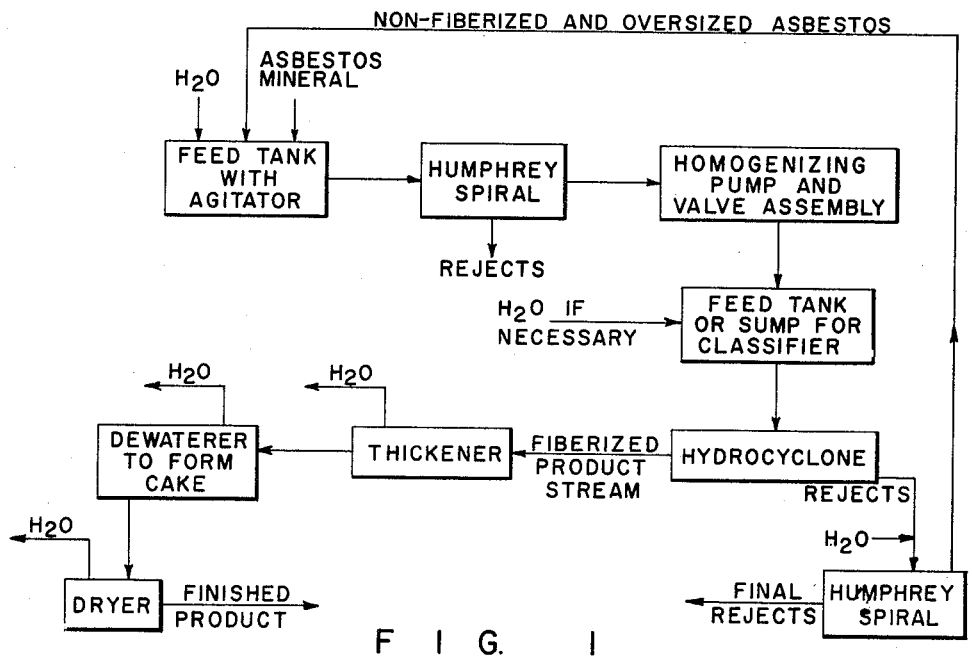

Dec. 22, 1964

M. I. COHN ETAL 3,162,380

METHOD OF TREATING ASBESTOS MINERALS

Original Filed April 18, 1960

INVENTORS
MORRIS I. COHN
ROY D. PERDUE
BY
Dike, Thompson, Bronstein & Mrose
ATTORNEYS 3,162,380
METHOD OF TREATING ASBESTOS MINERALS
Morris I. Cohn, Needham, and Roy D. Perdue, Tewksbury, Mass., assignors to Mineral Industries Corporation of America, Needham, Mass., a corporation of Massachusetts
Application Oct. 14, 1963, Ser. No. 316,187, which is a continuation of applications Ser. No. 197,812, May 17, 1962, and Ser. No. 197,813, May 17, 1962; said application Ser. No. 197,812 being a continuation of application Ser. No. 189,934, Apr. 24, 1962, which is a continuation of application Ser. No. 22,667, Apr. 18, 1960. Divided and this application Apr. 10, 1964, Ser. No. 359,818
9 Claims. (Cl. 241—4)

The present invention relates to the treatment of asbestos to decrease the fiber diameter and/or reduce the fiber length thereof. In nature, such fibers occur in varying lengths and in close side-by-side association. Once won from the ore, the asbestos is milled so as to accomplish a separation or longitudinal cleavage of fibers one from the other to a greater or lesser extent depending on the end use of the asbestos and the capability of the milling equipment. The ultimate fiber diameter of chrysotile asbestos can be as small as 200 A°. It may be desirable also, for certain end uses, for the fibers to be shortened by the milling operation.

Depending on the end use of the asbestos fiber, both the amount of grinding, i.e. reduction in fiber length, and extent of fiberizing, i.e. separating or opening up of individual fibers, will vary. Long fiber asbestos is frequently subjected to mechanical treatment designed to minimize shortening of the fiber and maximize the separation of one fiber from another. Short fiber asbestos is frequently subjected to mechanical treatment designed both to shorten and fiberize the fiber.

There is considerable demand for a short fiber asbestos having a high degree of fiberization.

It is an object of this invention to provide a novel method of grinding and fiberizing asbestos and asbestos concentrates.

It is a further object of the invention to provide a method of producing a highly fiberized asbestos product having a controlled particle size range. "Controlled particle size range" as used herein denotes a given and predictable percentage of product retained on a standard sieve when a sample of the product is placed on the sieve and screened in a reproducible manner.

It is a further object of the invention to provide a method of obtaining highly fiberized minerals, e.g. asbestos, serpentine, fibrous talc, etc. from essentially worthless mill tailings, thereby converting a substantial fraction of such tailings to products which have utility in wall board joint cements and as fibrous mineral fillers in rubber, plastics, bituminous compositions, and other commercially important applications.

It is a further object of the invention to provide a method of producing a fiberized asbestos product which is low in iron content and other unwanted impurities.

It is a further object to provide a method for fiberizing asbestos fibers to a greater extent than is possible with conventional fine grinding techniques presently used in the industry and thereby obtain products having by far better working properties than even the highest quality asbestos products presently available.

It is a further object to provide such a method which is flexible and by simple adjustment of manufacturing conditions can provide controlled grades of products.

It is a further object to provide such a method which is simple, inexpensive, lends itself to continuous production techniques, and can be carried out with relatively inexpensive and simple apparatus.

These objects are achieved in accordance with the method of the present invention by: (1) preparing a liquid slurry of the asbestos mineral to be fiberized; (2) passing the slurry under pressure through a homogenizer, preferably comprising a pressure pump and a homogenizing valve of the construction described in our Patent No. 3,039,703 and application Serial No. 782,992 (now abandoned), of which our application Serial No. 22,667 (now abandoned) is a continuation-in-part, this application being a continuation of our application Serial No. 189,934, filed April 24, 1962 (now abandoned) and application Serial No. 189,934 (now abandoned) being a continuation of application Serial No. 22,667 (now abandoned), and which are incorporated into this application by reference; (3) classifying the discharge from the homogenizer in a hydrocyclone or other wet classifying means; (4) thickening the overflow stream of the hydrocyclone or other wet classifier; (5) dewatering the thickened stream from step (4) to form a wet solids cake; and (6) drying the cake.

The percent solids in the slurry can be as high as will still yield a pumpable mass. Asbestos, asbestos concenrattes, or tailings from asbestos mills can be pumped at solids concentrations of 10% and higher, depending on the degree of consistency imparted to the slurry by the asbestos or other fibrous minerals in these feeds, so long as the slurry is flowable, i.e. a mass of the slurry will change its shape under the influence of gravity when the mass is initially placed on a stationary horizontal surface. The consistency depends on the degree of the fiberization of the asbestos or other fibrous minerals present. There is no lower limit to the concentration of solids except as the economics of the process may dictate. The lower the concentration, the less production will be obtained from a pressure pump of given capacity. The solids concentrations may be the same as those referred to in the above-mentioned applications, keeping in mind that with asbestos fibers the consistency of the slurry may limit the maximum concentration, i.e. the consistency of the slurry may render it unpumpable.

The initial particle sizes of the solids feed will be restricted in maximum size by the dimensions of the check valves in the pressure pump and the clearances in the homogenizing valve and to this extent the particles are sized, i.e. they are not substantially greater than the above-mentioned maximum size which can be handled by the homogenizing valve without plugging it. If bits of rock and serpentine are present, as in the case of treating asbestos mill tailings, the largest particle may be limited to that just passing a 10 or 20 mesh U.S. Standard sieve. The particle sizes may be the same as those referred to in the above-mentioned applications. In the case of asbestos, however, there is no lower limit to the particle size.

The solid material to be treated is normally charged continuously or batchwise to a feed tank provided with an agitator in which tank the percent solids is maintained at a predetermined value by the continuous or batchwise addition of water accompanied by agitation.

Prior to step (2) above, it may be desirable to treat the slurry mechanically or chemically in order to increase the advantageous effect of the homogenizing valve or remove unwanted material. For instance, as described in the example below, the slurry of asbestos mill tailings can be passed over a Humphrey spiral in a conventional manner to effect removal at the heavy mineral ports of a substantial fraction of iron compounds and unwanted non-fibrous gangue before passing the entire slurry through the homogenizing valve.

The high pressure pumping step is identical to that described in our application Serial No. 782,992 (now abandoned) and Patent No. 3,039,703. In practice, 1500 p.s.i. is sufficient to achieve a commercially practical grinding and fiberization effect. Where it is desired to fiberize asbestos materials with minimum shortening of fiber length of grinding, the variable of pressure and concentration may be adjusted to achieve the desired effect. It has been found in general that higher concentrations and lower pressures decrease grinding effect. Under such conditions, pressures as low as 250 p.s.i. may be considered practical. As set forth on page 11 of our application Serial No. 782,992 (now abandoned), in certain cases, some fiberization may occur at pressures as low as 100 pounds per square inch. Said application also refers to pressures from about 500 and 600 pounds per square inch to 6,000 pounds per square inch. The ranges of pressures and concentrations which can be used are the same as those described in the above-mentioned applications.

It has been found that the action of the homogenizing valve with its combining of shear, impact, and cavitation forces is ideally suited to fiberizing asbestos minerals and produces a much more highly fiberized asbestos product than is possible with conventional techniques. It is believed that this is due to the fact that the action of the homogenizer causes cleavage along parallel crystal planes, thereby separating the individual fibrils. In this respect, reference is made to the following statement in Bureau of Mines Bulletin #552, "The Asbestos Industry," Oliver Bowles, 1955, p. 6:

"Each filament of cotton, wool, or silk is of measurable and fairly constant diameter and is indivisible into finer sizes. On the other hand, fibers of chrysotile asbestos can be divided and subdivided until a fineness is attained that is limited only by the delicacy of the machinery used and the skill of manipulation. The ultimate fiber size is presumably the size of the ultimate molecule or crystal lattice of asbestos. In other words, fiberization is a cleavage process, and cleavage in minerals is defined as a tendency to split in a certain direction, that is, to separate along and between layers of molecules."

In using the conventional hydrocyclone for obtaining a fiberized product of controlled particle size range, a great latitude in selection of particle size range is afforded through the proper choice of cyclone diameter, overflow orifice, underflow orifice, and cyclone operating pressure. Moreover, when processing asbestos mill tailings, granular and heavy non-fibrous minerals report to the underflow of the cyclone together with oversize fibrous minerals. Retreatment of the diluted underflow on a Humphrey spiral, if desired, normally rejects the unwanted heavy minerals, permitting recycle of the oversize and non-fiberized asbestos back to the slurry feed tank for further grinding and fiberizing.

A stream of highly fiberized asbestos which is low in iron and other undesirable impurities reports to the overflow of the hydrocyclone. As mentioned above, the particle size range of the product in this stream will depend on the selection of cycloning variables.

Normally, some fibrous serpentine and finely ground co-occurring minerals, commonly referred to as rock dust in the industry, also report to the overflow of the cyclone. Such materials do not impair the product. Moreover, in some cases, it is desirable to adjust the hydrocyclone to insure that a certain percentage of such co-occurring minerals will report to the product stream, e.g. by decreasing the underflow orifice diameter and/or increasing the overflow orifice diameter. These minerals give certain working properties to the product which are considered beneficial in certain wall board joint cement formulations.

When processing asbestos and asbestos-containing materials, the fiberization resulting from one pass through the valve normally increases the consistency of the slurry to such an extent that considerable dilution should be effected before passing the ground and fiberized slurry through the hydrocyclone. If such dilution is not used, the fibrous particles interfere with one another during the cyclone operation, considerable oversize reports to the overflow by entrainment, and a sharp classification is not obtained. The dilution necessary to achieve good results in the hydrocyclone can be easily determined by routine tests. In general, it is desired to minimize dilution while still achieving adequate classification in order to minimize the amount of water which must be later removed.

Thickening and dewatering of the overflow from the hydrocyclone present little trouble. These minerals have a specific gravity in the order of 2.50 or more and settle rapidly in water to affect easy decantation and thickening. The use of a conventional rake thickener followed by a conventional continuous rotary filter for dewatering normally provides a filter cake of at least 50% solids, by weight, for subsequent drying.

The filter cake can be dried in a direct fired tunnel dryer fitted with a conveyor belt or may be dried by conventional steam heated equipment.

It is understood that any of the above can be altered or omitted without departing from the essence of the invention, which is the use of a stationary or rotating homogenizing valve of the construction described in our application Serial No. 782,992 (now abandoned) and Patent No. 3,039,703 to affect grinding and fiberizing of fibrous materials.

The term asbestos as used in this description is meant to include not only chrysotile but also the amphibole asbestos fibers as well, such as amosite, anthophyllite, crocidolite, and termolite.

The process can be used on any fibrous mineral, such as serpentine, fibrous magnesium silicates, etc.

A preferred apparatus is that described in application Serial No. 782,816, now U.S. Patent No. 3,039,703, equipped with a rotating homogenizing valve and blade and a rotating impact ring.

Figure 2:
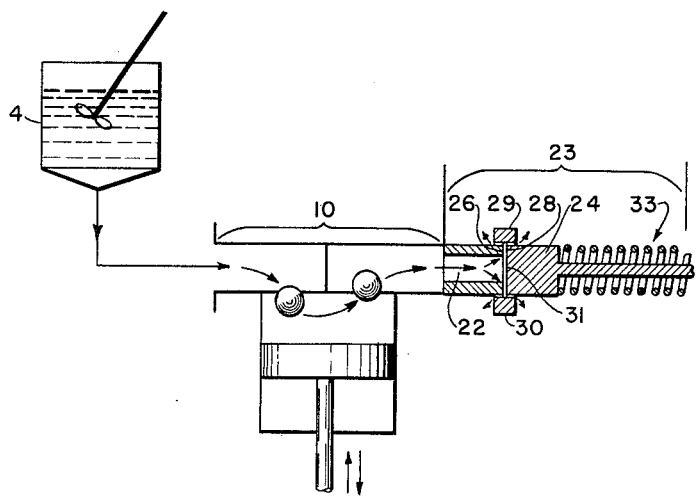

FIG. 1 of the accompanying drawings is a flow sheet of the method of the present invention with the processing units being shown in boxes and identified, and FIG. 2 is a diagrammatic view of the slurry making tank and the homogenizing pump and valve assembly and is the same as FIG. 3 of application Serial No. 782,992.

The various flows and apparatus of FIG. 1 are identified in the drawing and need no further explanation.

In FIG. 2, 4 is the slurry tank to which water and asbestos are added and stirred to form the slurry feed. The slurry feed is fed to the pump unit 10 which pumps it at a high pressure through a passage 22 of the homogenizing valve assembly 23 and against valve 24 which is urged toward valve seat 26 by a heavy spring 33. The high pressure exerted on the valve 24 by the slurry in the confined passage 22 forces the valve slightly away (a fraction of an inch) from its seat 26 whereby the slurry under pressure flows at an extremely high velocity through the highly restrictive valve opening 28 against an annular impact ring 30 extending around the valve. The slurry then flows through the narrow passage 29 between the ring 30 and the adjacent outer peripheral walls of the valve and seat. Fiberizing and grinding of the asbestos are achieved by the shearing effect on the asbestos particles of the closely spaced valve seat 26 and valve face 31 forming valve opening 28 and of the closely spaced impact ring 30 and outer peripheries of the valve and valve seat forming passage 29, all of which are made of a very hard material such as tungsten carbide, by the turbulence and cavitation of the asbestos particles as they flow through opening 28 against impact ring 30 and through passage 29 and by shattering on impact of the particles against the impact ring 30 and valve face 31. The various changes in directional flow of the slurry from 22 to 28 and from 28 to 29 also contribute to the delaminating (defiberizing) and grinding phenomena. It is believed that the liquid media contributes to the effectiveness of the fiberizing and grinding forces.

It is also believed that the restricted valve opening 28 functions to flow orient the asbestos particles with the longitudinal axes of the asbestos fibers thereof generally aligned in or parallel to the direction of flow through the opening, resulting in a cleavage of the fibers, one from another.

The distance between the valve seat surface 26 and the valve face 31 is the same as that disclosed in our U.S. application Serial No. 782,992 (now abandoned). As set forth on page 12 of that application, opening sizes in the nature of between about .001 and .005 inch (less than .010 inch) are typical. The lower limit is dictated only by practical considerations. Opening sizes greater than about .090 inch require such a high pumping rate or such a small diameter of passage 22 to achieve adequate velocity through opening 28 that they are not commercially practical. In fact, opening sizes greater than about .050 inch are difficult to use, although in certain cases and under certain conditions, some fiberization may occur with opening sizes as large as about 0.10 inch.

Example

A Canadian asbestos mill tailing containing no particle greater than that passing a U.S. Standard 20 mesh sieve was treated in the following manner. A tank provided with an agitator was charged with 52.5 gallons of water and 23 pounds of tailings to produce a 5% by weight mineral slurry. The slurry was passed through a homogenizer having the construction described in our Patent No. 3,039,703, equipped with a rotating valve and blade and a rotating impact ring as described in said application but not with a rotating valve seat and having the following dimensions, in inches, as noted in FIG. 2 of that application: $a=0.250$; $b=0.500$; $c=0.032$; $d=$approx. 0.001 to 0.020; $e=0.3125$; $f=0.125$; $g=0.250$; $h=0.500$. The valve, blade, and impact ring were rotated at 900 r.p.m. The slurry was pumped through the rotating valve at 4 gallons per minute at a pressure of 1500 p.s.i.

The fiberized and ground mineral slurry discharged from the valve was passed to the sump of an 8" hydrocyclone circuit. Sufficient water was added in the sump to dilute the slurry to 1% solids by weight, i.e. a 4 to 1 dilution. The cyclone was fitted with a 2½" overflow orifice and a ⅞" underflow orifice. The 1% slurry was passed through the cyclone at a pressure of 5 p.s.i.g. at a rate of approximately 120 gallons per minute by centrifugal pump. The overflow was collected in barrels and had a solids concentration of 0.75%. The underflow was collected in a barrel and had a solids concentration of 2.74%. There was a recovery of approximately 60%, i.e. 0.6 pound of solid reported to the overflow of the hydrocyclone for every 1.0 pound fed to the hydrocyclone.

The overflow solids were allowed to settle, more than 75% of the water associated therewith was decanted. The thickened slurry was vacuum filtered and dried in trays on steam coils. The overflow solids were composed chiefly of chrysotile asbestos and fibrous serpentine with some rock dust present. These solids possessed high consistency as compared to the feed when mixed with 3 parts of water to 1 part of solids, which indicated that they were highly fiberized and finely divided. They had a color characteristic of the chrysotile fiber itself, and provided good cement formulations. Approximately 85% of the solids passed a U.S. Standard 325 mesh screen.

The underflow solids were discarded because of low value, being composed of heavy minerals, iron compounds, and little fibrous material. If desired, the underflow can be recycled back to the feed after removal of heavy minerals and iron compounds.

Asbestos is a platy or layer-like mineral occurring in the form of laminated layers, as described in the above-mentioned applications.

Although in the above-described method, the asbestos slurry discharged from the valve opening is directed against an impact surface, with certain deposits of asbestos, the impact ring can be omitted in which case, defiberization is accomplished by passage through the valve opening only.

This application is a division of application Serial No. 316,187, filed October 14, 1963, which in turn is a continuation of applications Serial Nos. 197,812 and 197,813, both filed May 17, 1962, and both now abandoned. This application discloses only subject matter disclosed in said application Serial No. 197,812, which is a continuation of our application Serial No. 189,934, filed April 24, 1962, now abandoned, which in turn is a continuation of our application Serial No. 22,667, filed April 18, 1960, now abandoned.

We claim:

1. A method of fiberizing sized asbestos mineral particles, said method comprising forcing a flowable liquid slurry of said asbestos mineral particles in the form of a thin film edgewise through a thin, hard-surfaced gap under a high pressure of at least 100 pounds per square inch and at an extremely high velocity by virtue of reduction of said high pressure to a substantially lower pressure to separate the fibrous layers of said asbestos mineral particles.

2. A method according to claim 1, said high pressure forcing said gap to open to provide said flow of slurry therethrough against a yieldable force tending to close said gap.

3. A method according to claim 1, said film having a maximum thickness of about 0.09 inch and moving through said gap with a substantial and relatively abrupt change in direction as compared to the direction of flow to the gap, said pressure being at least about 250 pounds per square inch.

4. A method of fiberizing sized asbestos mineral particles, said method comprising forcing a flowable liquid slurry of said asbestos mineral particles in the form of a thin film edgewise through a thin, hard-surfaced gap under a high pressure of at least 100 pounds per square inch at an extremely high velocity by virtue of reduction of said high pressure to a substantially lower pressure against a hard impact surface to separate the fibrous layers of said asbestos mineral particles.

5. A method according to claim 4, said film having a maximum thickness of about 0.09 inch and moving through said gap with a substantial and relatively abrupt change in direction as compared to the direction of flow to the gap, said pressure being at least about 250 pounds per square inch.

6. A method according to claim 4, said slurry being an aqueous slurry.

7. A method according to claim 4, said high pressure forcing said gap to open to provide said flow of slurry therethrough against a yieldable force tending to close said gap.

8. A method according to claim 7, said film having a maximum thickness of about 0.09 inch and moving through said gap with a substantial and relatively abrupt change in direction as compared to the direction of flow to the gap, said pressure being at least about 600 pounds per square inch.

9. A method of fiberizing sized mineral particles of the group consisting of asbestos and serpentine mineral particles, said method comprising forcing a flowable liquid slurry of said mineral particles in the form of a thin film edgewise through a thin, hard-surfaced gap under a high pressure of at least 100 pounds per square inch and at an extremely high velocity by virtue of reduction of said high pressure to a substantially lower pressure to separate the fibrous layers of said mineral particles.

References Cited by the Examiner

UNITED STATES PATENTS

| | | | |
|---|---|---|---|
| 1,654,268 | 12/27 | Nielsen | 252—306 |
| 1,739,360 | 12/29 | Hopkins | 241—253 |
| 1,741,869 | 12/29 | Mett | 241—4 |
| 1,829,039 | 10/31 | Davenport | 241—4 |
| 1,934,637 | 11/33 | Rafton | 241—21 |
| 2,512,471 | 6/50 | Trist | 259—18 |

FOREIGN PATENTS 528,163  10/40  Great Britain.

J. SPENCER OVERHOLSER, *Primary Examiner.*